(12) United States Patent
Fukano et al.

(10) Patent No.: US 9,549,231 B2
(45) Date of Patent: Jan. 17, 2017

(54) OPTICAL TRANSMISSION DEVICE AND OPU FRAME GENERATION METHOD

(71) Applicant: FUJITSU LIMITED, Kawasaki-shi, Kanagawa (JP)

(72) Inventors: Haruhisa Fukano, Munakata (JP); Toshiharu Hirose, Fukuoka (JP); Akira Hashimoto, Fukuoka (JP); Koji Nekoda, Fukuoka (JP); Koichi Kinoshita, Fukuoka (JP); Akira Hatae, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/830,056

(22) Filed: Aug. 19, 2015

(65) Prior Publication Data

US 2016/0094900 A1 Mar. 31, 2016

(30) Foreign Application Priority Data

Sep. 30, 2014 (JP) .................................. 2014-201816

(51) Int. Cl.
| | |
|---|---|
| *H04J 14/00* | (2006.01) |
| *H04Q 11/00* | (2006.01) |
| *H04J 3/16* | (2006.01) |
| *H04J 3/07* | (2006.01) |
| *H04L 12/935* | (2013.01) |

(52) U.S. Cl.
CPC ............. *H04Q 11/0003* (2013.01); *H04J 3/07* (2013.01); *H04J 3/1652* (2013.01); *H04L 49/3009* (2013.01); *H04Q 2011/0045* (2013.01)

(58) Field of Classification Search
CPC ............. H04Q 11/0003; H04Q 11/0005; H04J 14/0201; H04J 14/02
USPC .. 398/45, 46, 47, 48, 49, 50, 52, 56, 58, 79, 398/66, 68, 98, 100, 140, 141, 182, 183, 398/192, 193, 194, 135, 136; 370/474, 370/465, 505, 503, 476, 535, 539, 252, 370/228
See application file for complete search history.

(56) References Cited

U.S. PATENT DOCUMENTS

| | | | |
|---|---|---|---|
| 8,989,222 B1* | 3/2015 | Mok | ................... H04J 14/0201 370/474 |
| 2007/0076769 A1* | 4/2007 | Zou | ........................ H04J 3/1658 370/539 |
| 2010/0226648 A1 | 9/2010 | Katagiri et al. | |
| 2012/0014270 A1 | 1/2012 | Honma et al. | |

FOREIGN PATENT DOCUMENTS

| | | |
|---|---|---|
| JP | 2010-212890 | 9/2010 |
| JP | 2012-23647 | 2/2012 |

* cited by examiner

*Primary Examiner* — Hanh Phan
(74) *Attorney, Agent, or Firm* — Staas & Halsey LLP

(57) ABSTRACT

An optical transmission device includes: a serializer and deserializer configured to convert an input client signal into parallel data at a sampling rate of k times (k is a power of 2) a rate of the input client signal and output the parallel data; a frame generation section configured to generate an optical channel payload unit (OPU) frame from the client signal; and a stuff control section connected to an output of the parallel data and configured to perform, in units of 1/k bits, a stuff operation to map the client signal into the OPU frame and thereby calculate a $Cn(n=1/k)$ value which is a theoretical value of the stuff operation.

6 Claims, 14 Drawing Sheets

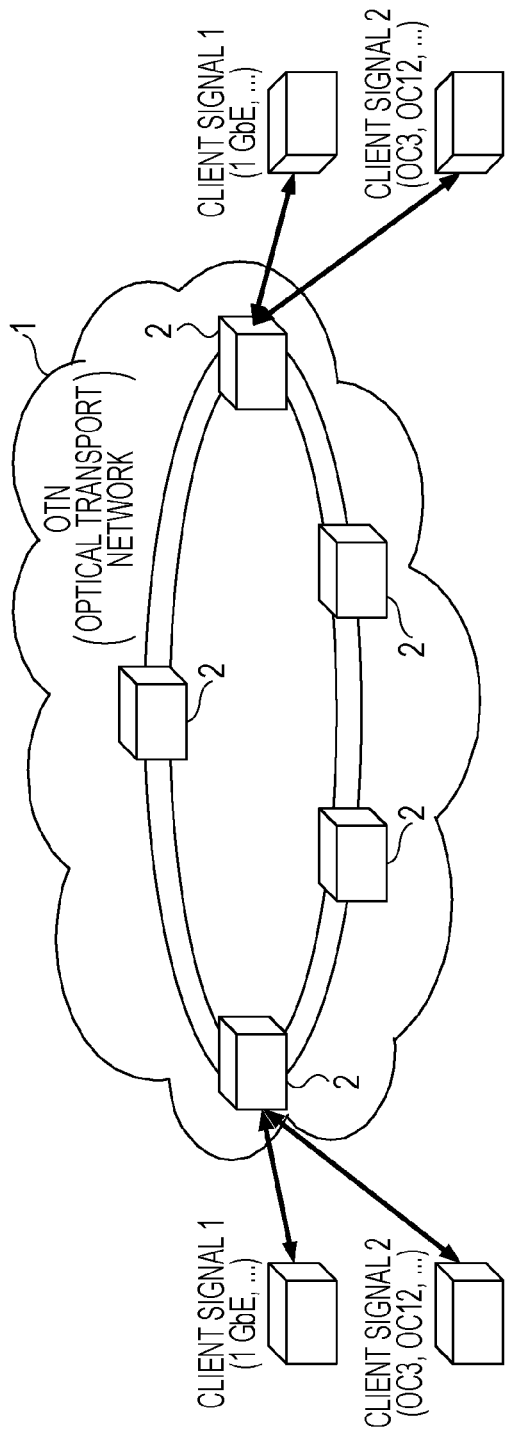

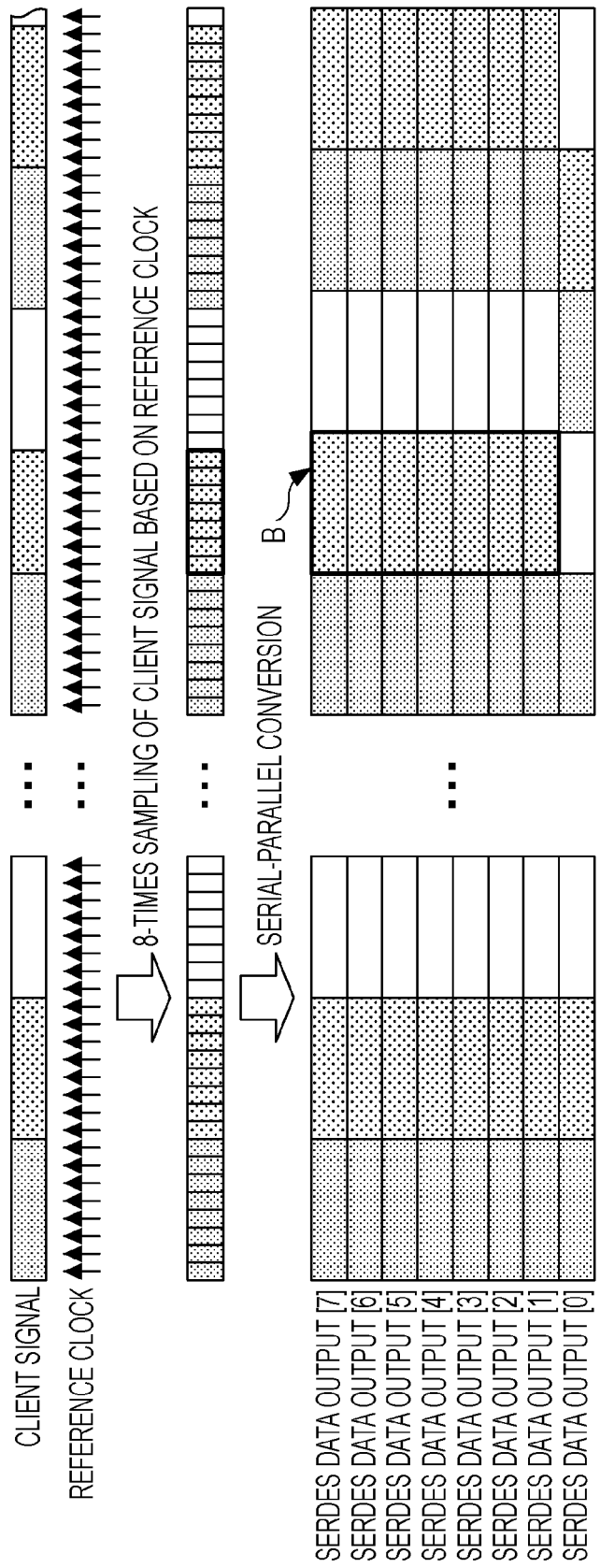

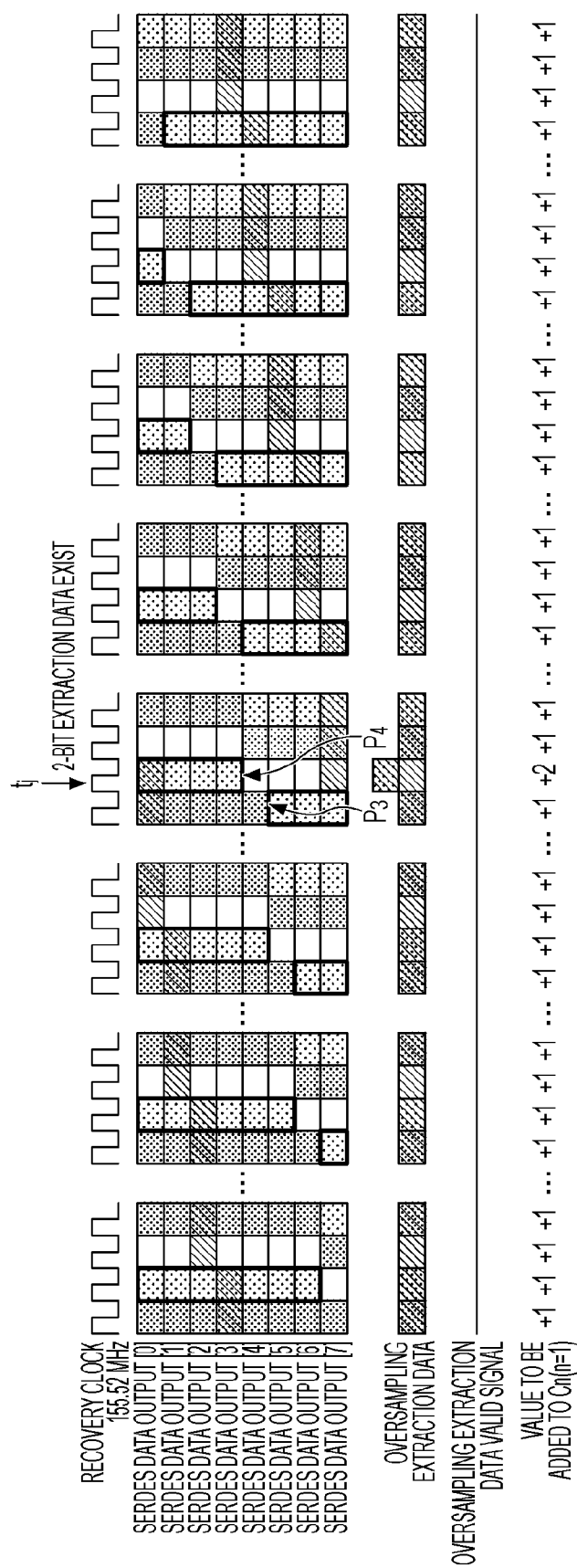

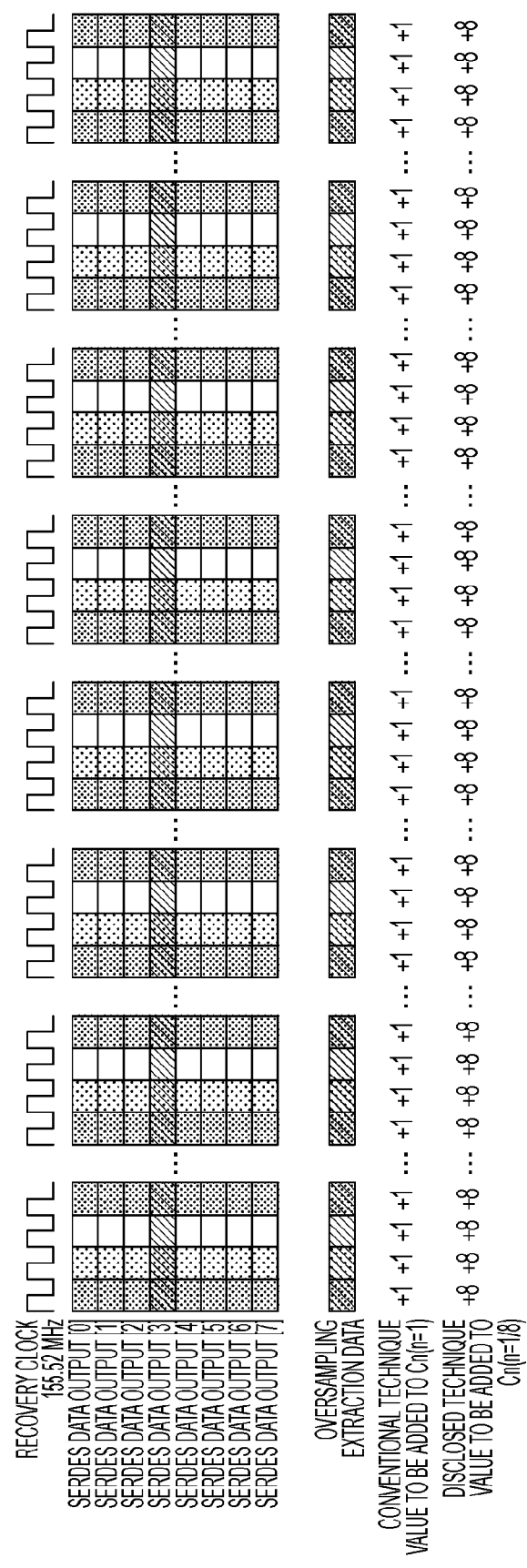

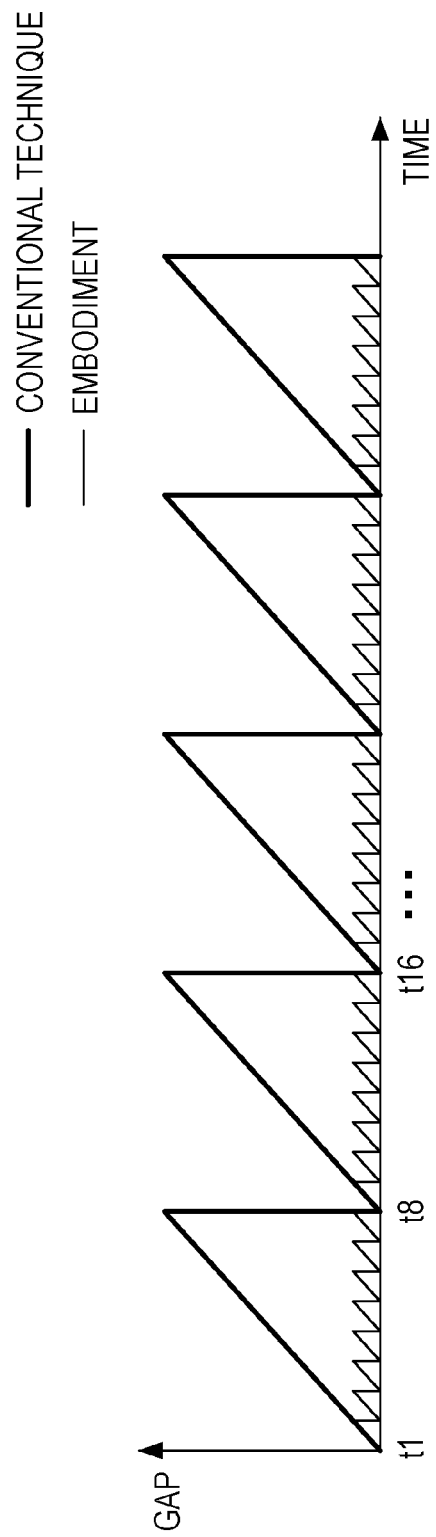

OPTICAL TRANSMISSION DEVICE AND OPU FRAME GENERATION METHOD

CROSS-REFERENCE TO RELATED APPLICATION

This application is based upon and claims the benefit of priority of the prior Japanese Patent Application No. 2014-201816, filed on Sep. 30, 2014, the entire contents of which are incorporated herein by reference.

FIELD

The embodiments discussed herein are related to an optical transmission device and an OPU frame generation method used in optical transmission networks.

BACKGROUND

In present optical core networks, the optical transport network (OTN) has been widely used as basic platforms. The OTN is optical transport standards recommended by the International Telecommunication Union-Telecommunication Standardization Sector (ITU-T) in 2000. As illustrated in FIG. 1, in an OTN optical core network 1, network devices 2 are connected to each other via an optical fiber network. The OTN optical core network 1 enables high-capacity transmission by accommodating or multiplexing, in OTN frames, various client signals such as synchronous optical network (SONET) signals, Gigabit Ethernet (GbE, trademark) signals, and fiber channel (FC) signals. The client signals are mapped into OTN frames in the order of optical channel payload unit (OPU) frames, optical channel date unit (ODU) frames, and optical transport unit (OTU) frames. When the client signals are mapped into the OPU frames, stuff control is performed using the generic mapping procedure (GMP) which is an asynchronous accommodation scheme (see Japanese Laid-Open Patent Publications Nos. 2010-212890 and 2012-023647, for example).

FIG. 2A illustrates a configuration example of a general network device 2. Optical modules $21_1$ to $21_k$ receive multiple client signals (optical signals). The received signals are subjected to data reception processing by low-speed interface processing sections $22_1$ to $22_k$, and then the data are selected by a cross-connect section 23. The selected data are multiplexed by a multiplexer 24, and then accommodated in OTN frames by a high-speed interface processing section 26. The OTN frames are converted into optical signals by an optical module 27, and the optical signals are transmitted to an OTN network. OTN frames received from the OTN network are subjected to the above processes in the reverse order and output from the optical modules $21_1$ to $21_k$ as client signals.

FIG. 2B illustrates a circuit configuration of each low-speed interface processing section 22. A serializer and deserializer (hereinafter referred to as "SERDES") 31 is configured to use a reference clock to detect a change point from a serially transmitted client signal and reproduce a recovery clock synchronous with the client signal. The SERDES 31 is also configured to perform serial-to-parallel conversion on the client signal and output parallel data.

In present circumstances, the SERDES 31 is capable of reproducing a recovery clock synchronous with a client signal if the client signal is at a rate of 600 Mbps or higher.

Since the speed of the SERDES 31 has been increasing, the SERDES is incapable of reproducing a recovery clock synchronous with a client signal if the signal is a low-speed signal (155.52 Mbps or lower).

For this reason, digital oversampling using the high-speed SERDES 31 is employed to receive a low-speed signal such as an optical carrier-level 3 (OC-3) signal.

The SERDES 31 samples a serially transmitted client signal at a rate of 8 times the original rate, for example, performs serial-to-parallel conversion on the signal, and outputs parallel data.

An oversampling extraction circuit 32 is configured to detect a change point in the parallel data output from the SERDES 31, extract data from a midpoint between one data change point and a subsequent data change point as valid data, and output the extracted data together with an oversampling extraction data valid signal.

If no data change point exists, the circuit extracts valid data using the position of the previous change point as a reference.

A stuff operation section 33 is configured to compute, according to the type of a client signal, the number of data of the client signal received per OPU frame (Cn value), the number of data of the client signal to be actually mapped into one OPU frame (Cm value), and the number of data of the client signal to be accumulated without being mapped (ΣCnD value).

The Cn value is a theoretical value representing the amount of data to be mapped into one OPU frame in units of n bits, and n=1 in the case of OC-3 (mapping processing on a per-bit basis).

When a recovery clock and the received client signal are synchronous, the Cn value may be obtained from the number of edges of the recovery clock per OPU frame. However, because oversampling is performed in the configuration of FIG. 2B, the recovery clock is asynchronous with the received client signal.

Hence, the Cn value is computed from the oversampling extraction data valid signal.

An OPU frame generation section 34 is configured to generate an OPU frame, perform stuff control based on the Cm value obtained by the stuff operation section 33, and map the client signal into the OPU frame.

The OPU frame generation section 34 is also configured to insert the Cm value and the ΣCnD value into the overhead of the OPU frame as justification control (JC) bytes.

An OPU frame format and a method of mapping a client signal into an OPU frame are defined in the OTN optical transport standard.

When a low-speed client signal is oversampled and output as parallel data using a reference clock, a gap (or phase deviation) between the frequency of the reference clock and the frequency of the client signal is accumulated gradually if the reference clock and the client signal are asynchronous.

This causes a gap corresponding to one bit of the client signal at a fixed cycle according to the difference between the frequencies of the reference clock and the client signal, as will be described later.

This gap corresponding to one bit of the client signal may cause jitter and wander in the stuff control.

In addition, the gap corresponding to one bit of the client signal is also propagated to the stuff operation section 33 and the OPU frame generation section 34.

Since the OPU frame reception side reproduces the clock of the client signal based on the received Cm value and ΣCnD value, the client signal extracted by the reception side has a gap corresponding to one bit (6 ns in the case of OC-3) from the original signal.

This gap causes jitter and wander on the reception side.

The embodiments aim to provide an optical transmission device and a signal frame generation method which may reduce a gap caused when a low-speed client signal is mapped into an OPU frame and thereby suppress jitter and wander.

SUMMARY

According to an aspect of the embodiments, an optical transmission device includes: a serializer and deserializer configured to convert an input client signal into parallel data at a sampling rate of k times (k is a power of 2) a rate of the input client signal and output the parallel data; a frame generation section configured to generate an optical channel payload unit (OPU) frame from the client signal; and a stuff control section connected to an output of the parallel data and configured to perform, in units of 1/k bits, a stuff operation to map the client signal into the OPU frame and thereby calculate a Cn(n=1/k) value which is a theoretical value of the stuff operation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a schematic diagram of an OTN network;

FIGS. 3A and 3B are diagrams explaining a problem caused when a reference clock and a client signal are asynchronous;

FIG. 4A and FIG. 4B are diagrams explaining a problem caused when a reference clock and a client signal are asynchronous;

FIG. 7 is a diagram explaining stuff processing according to the embodiment;

FIG. 10 is a diagram illustrating a comparison between the effect of the stuff operation of the embodiment and that of the conventional method.

DESCRIPTION OF EMBODIMENTS

Before describing an embodiment, with reference to FIGS. 3A through 5, a description is given of a problem, recognized by the inventors, which may occur in present OPU frame mapping.

The SERDES 31 uses a reference clock to sample a low-speed client signal (for example an OC-3 signal of 155.52 Mbps) at a rate of 8 times (1244.16 Mbps) the rate of the client signal.

Because the client signal and the reference clock are asynchronous, the phase deviation between the client signal and the reference clock is accumulated, which makes a one-bit client signal to be converted to a data output of 9 bit width or 7 bit width at a certain time point.

Figure 3A:
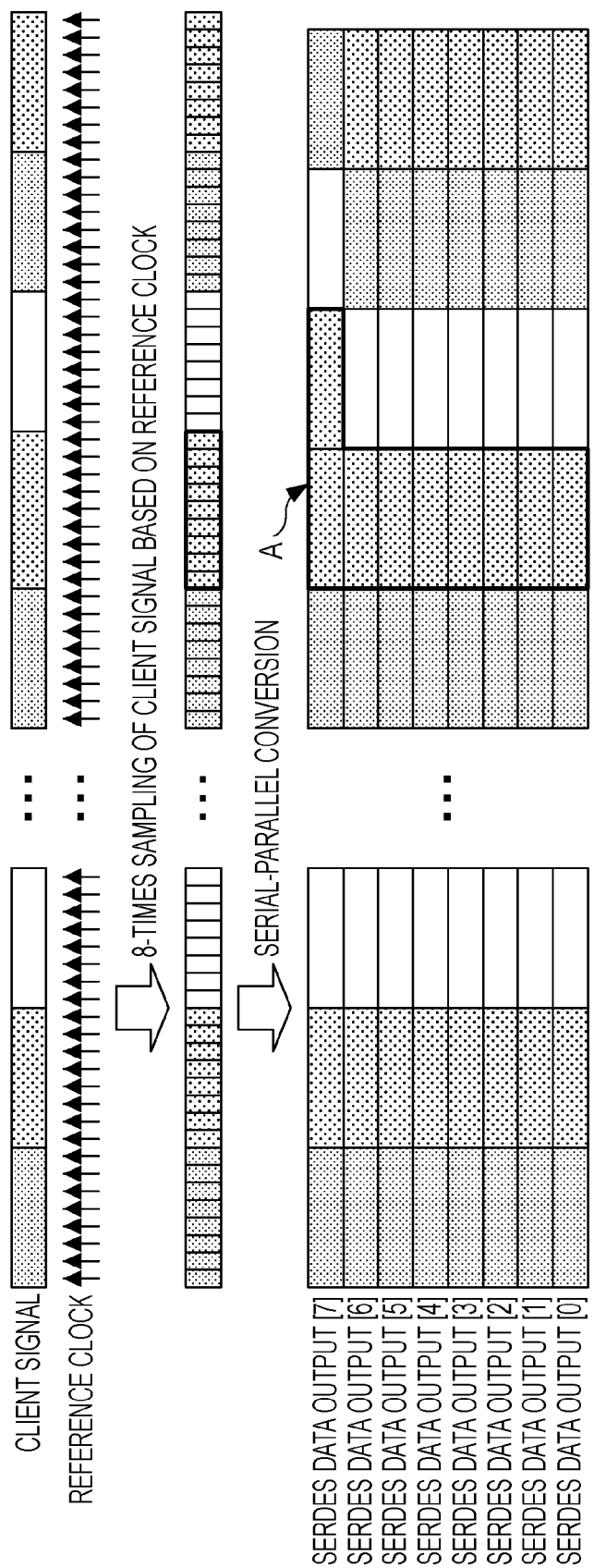

In an example of FIG. 3A, the frequency of the client signal is smaller than the frequency of the reference clock, and thus oversampled output data may have a 9-bit width as illustrated by a frame A.

In an example of FIG. 3B, the frequency of the client signal is larger than the reference clock, and thus oversampled output data may have a 7-bit width as illustrated by a frame B.

Such a variation in bit width of SERDES output data occurs periodically depending on the frequencies of the reference clock and the client signal.

Figure 4A:
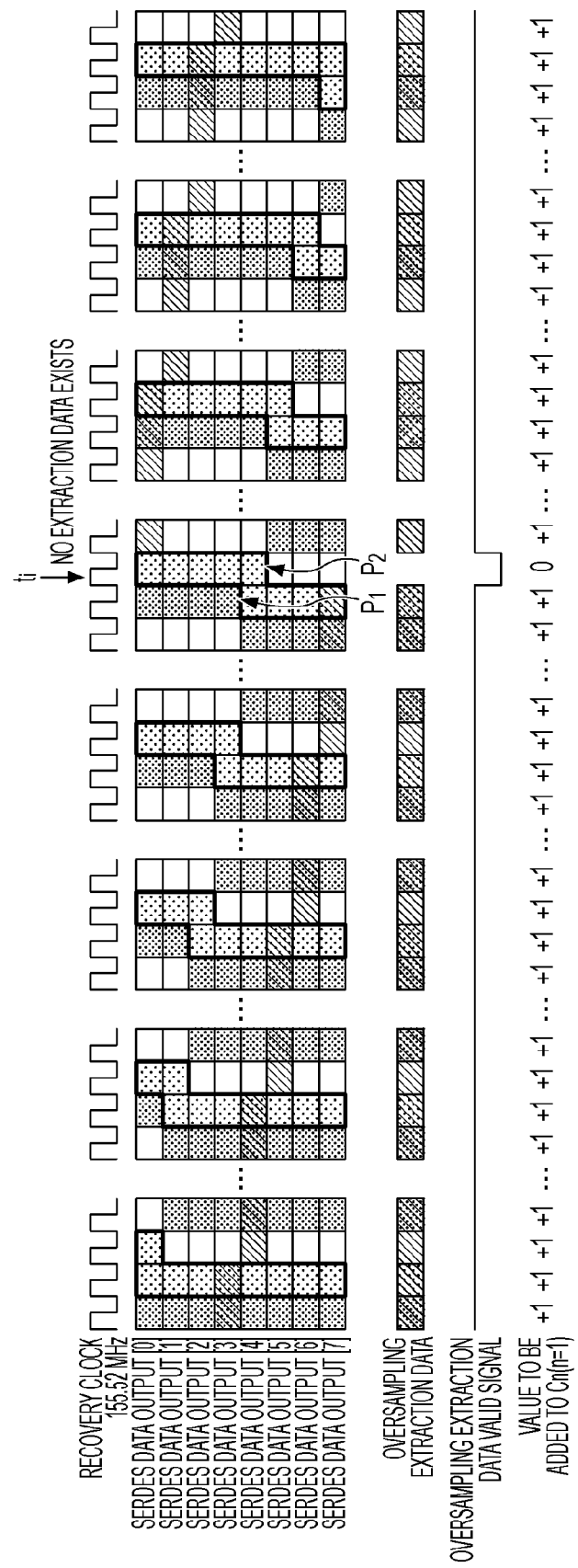

FIGS. 4A and 4B illustrate extraction of valid data from SERDES output data.

FIG. 4A illustrates a case where the frequency of the client signal is smaller than the frequency of the reference clock and a parallel signal of 9 bit width is output at a fixed cycle.

FIG. 4B illustrates a case where the frequency of the client signal is larger than the frequency of the reference clock and a parallel signal of 7 bit width is output at a fixed cycle.

To extract valid data from parallel data obtained by high speed sampling, data in the middle of one data change point and a subsequent data change point is extracted as valid data.

This is because middle-part data located farther from the change point is more stable.

In the case of FIGS. 4A and 4B, because the 8-times oversampling is performed, the fourth data from every data change point is extracted as valid data as illustrated by diagonal lines, for example.

If data to be extracted exists, the oversampling extraction data valid signal becomes a high-potential signal (High), for example.

FIGS. 4A and 4B illustrate an example where data changes per bit; however, if there is no data change over several bits, the fourth data from the position of a previous data change point and the eighth data from the position of this fourth data are extracted, for example.

When data from a midpoint between data change points is extracted as valid data in the case of FIG. 4A, neither the fourth data from a data change point $P_1$ nor the fourth data from a data change point $P_2$ exists at a time point $t_i$, which means that there is no valid data to be extracted at this timing.

At this time, the oversampling extraction data valid signal becomes a low-potential signal (Low), and a value to be added to Cn(n=1) by the stuff operation section 33 is 0.

In other words, the gap (the phase deviation between the reference clock and the client signal) accumulated to correspond to one bit of the client signal is reflected even to the stuff control.

When data from a midpoint between data change points is extracted as valid data in the case of FIG. 4B, two data are output as valid data at a time point $t_j$.

Specifically, the fourth data from a data change point P3 and the fourth data from a data change point P4 are extracted.

In this case, the value to be added to Cn(n=1) by the stuff operation section 33 is +2, meaning that the gap corresponding to one bit of the client signal is still reflected to the stuff control.

Figure 5:
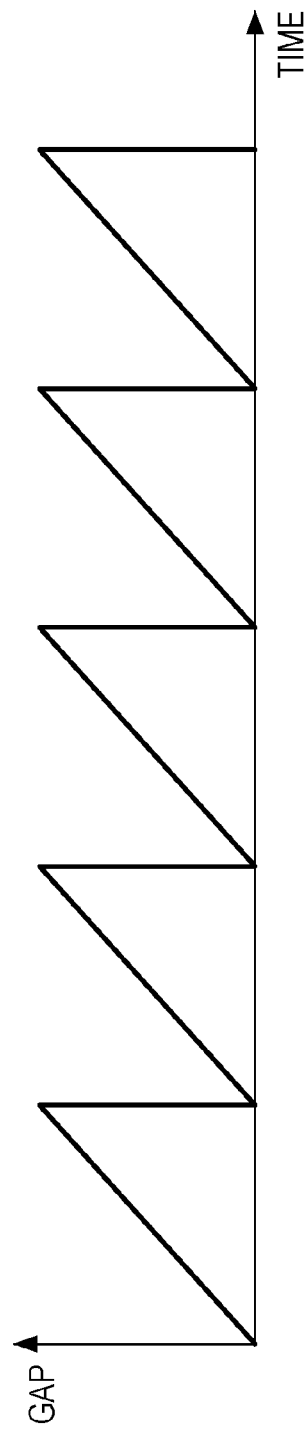
FIG. 5 is a diagram explaining a periodical gap corresponding to one bit of a client signal in a stuff operation.

FIG. 5 is a diagram illustrating the gap (the phase deviation between the client signal and the reference clock) to be succeeded to the stuff operation.

The size of the gap becomes maximum when there is no valid data output (when the value to be added to Cn(n=1) is zero) or when 2-bit valid data are extracted (when the value to be added to Cn(n=1) is +2), and the accumulated gap becomes zero immediately after the extraction of 0 bit or 2 bits.

The gap corresponding to one bit of the client signal occurs periodically, causing jitter and wander in the stuff control.

In addition, as described above, the client signal extracted by the reception side has a gap corresponding to one bit from the original signal, and this gap causes jitter and wander.

To solve this, the embodiment suppresses jitter and wander by reducing a gap caused when a low-speed client signal is mapped into OPU frames (a phase deviation between the client signal and the reference clock).

Specifically, Cn operation or mapping processing is performed at finer granularity according to the rate (frequency) of the client signal.

For example, when a low-speed client signal is oversampled and converted into a high-speed parallel signal, a stuff operation is performed at a grain size of the reciprocal of the oversampling rate.

In the case of the 8-times oversampling, a value to be added to a Cn value is calculated in units of ⅛ bits so as to perform Cn operation at a grain size of ⅛.

Thereby, the gap (phase deviation) between the reference clock and the client signal is detected and resolved before the accumulation of the phase deviation becomes large, thus suppressing jitter and wander.

Figure 6A:
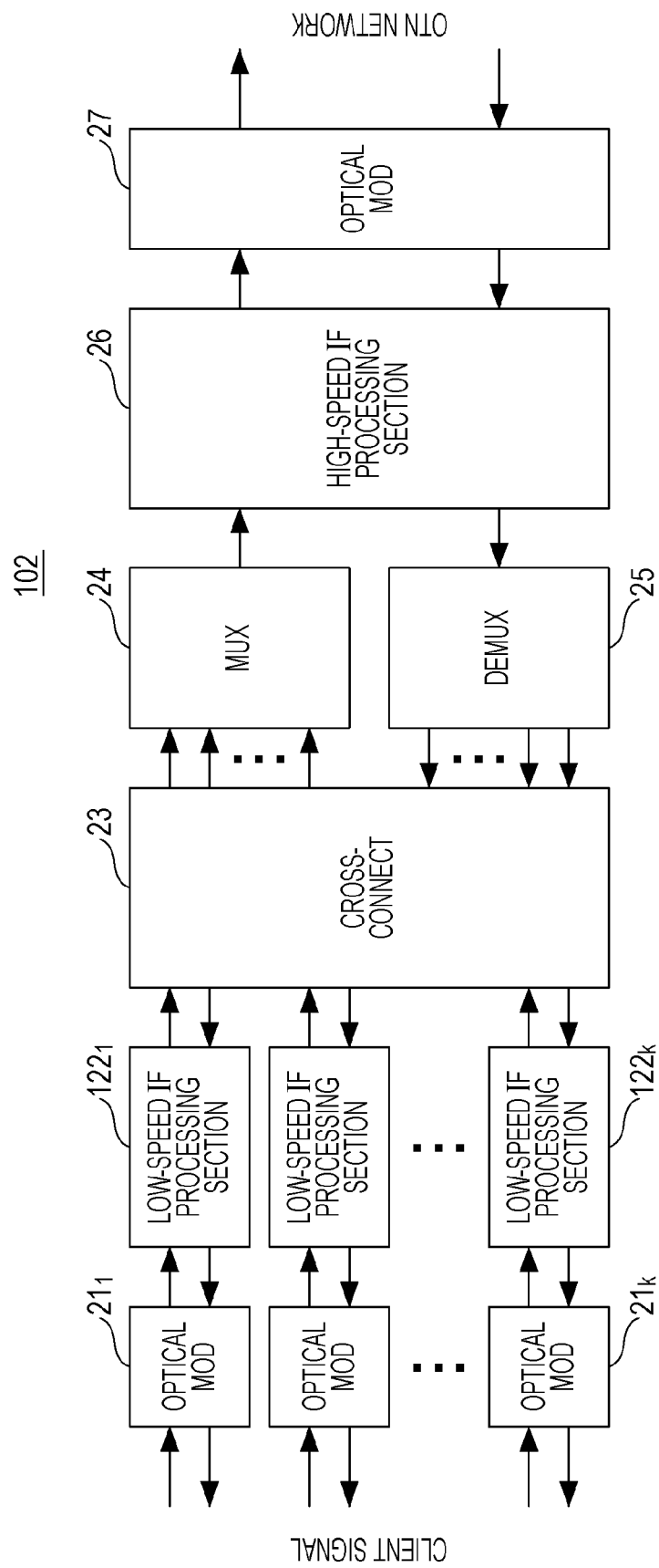
FIG. 6A and FIG. 6B illustrate configuration examples of an optical transmission device and OPU frame mapping according to an embodiment.
Figure 6B:
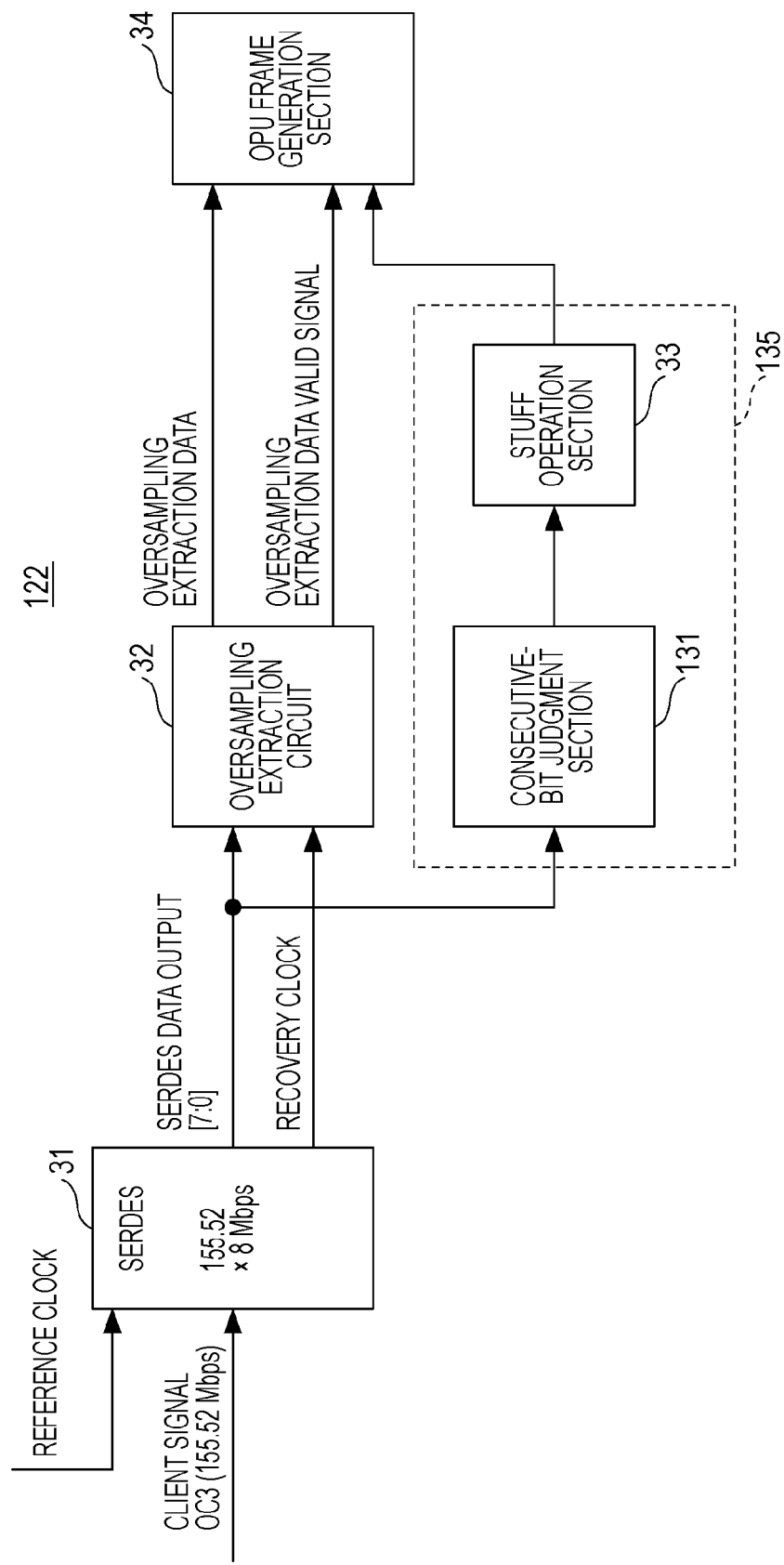

FIGS. 6A and 6B illustrate configurations of an optical transmission device 102 as an example of a network device according to the embodiment and OPU frame mapping.

Figure 2A:
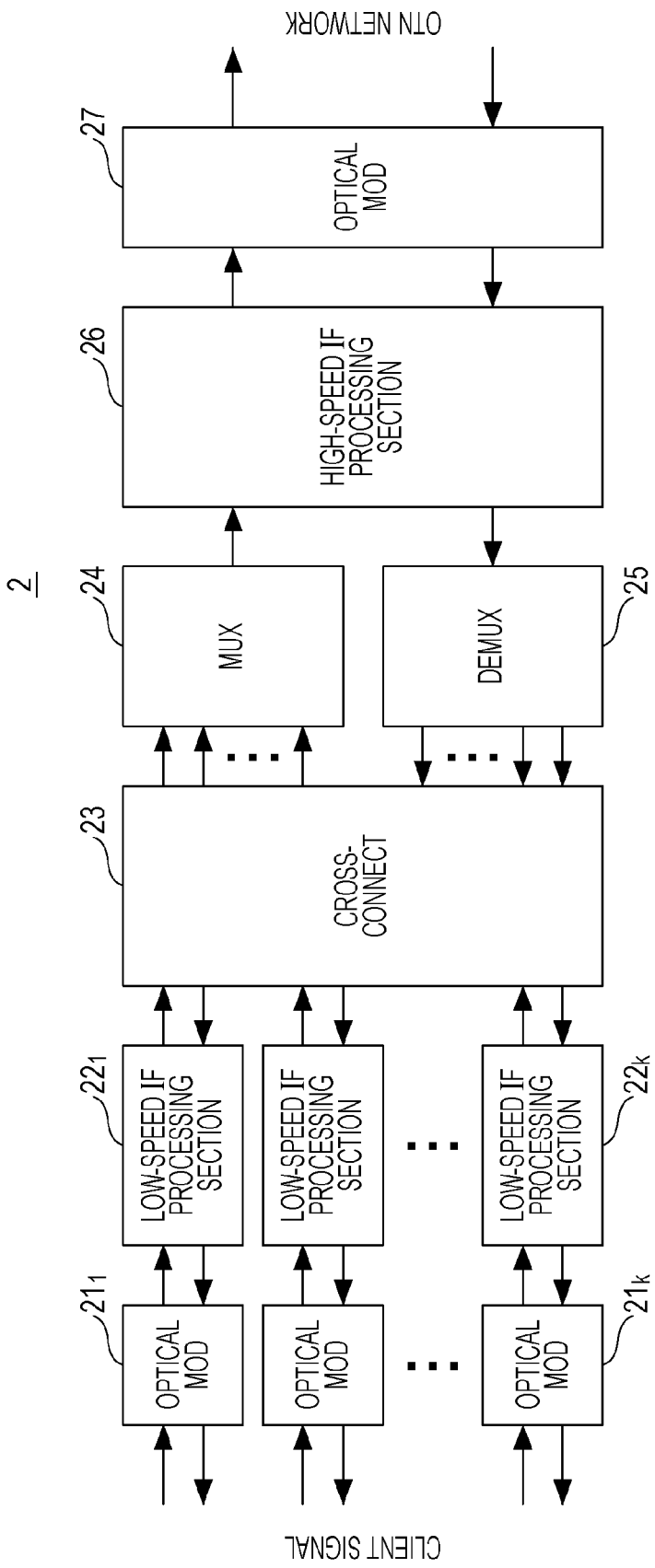
FIG. 2A is a schematic configuration diagram of an OTN network device.
Figure 2B:
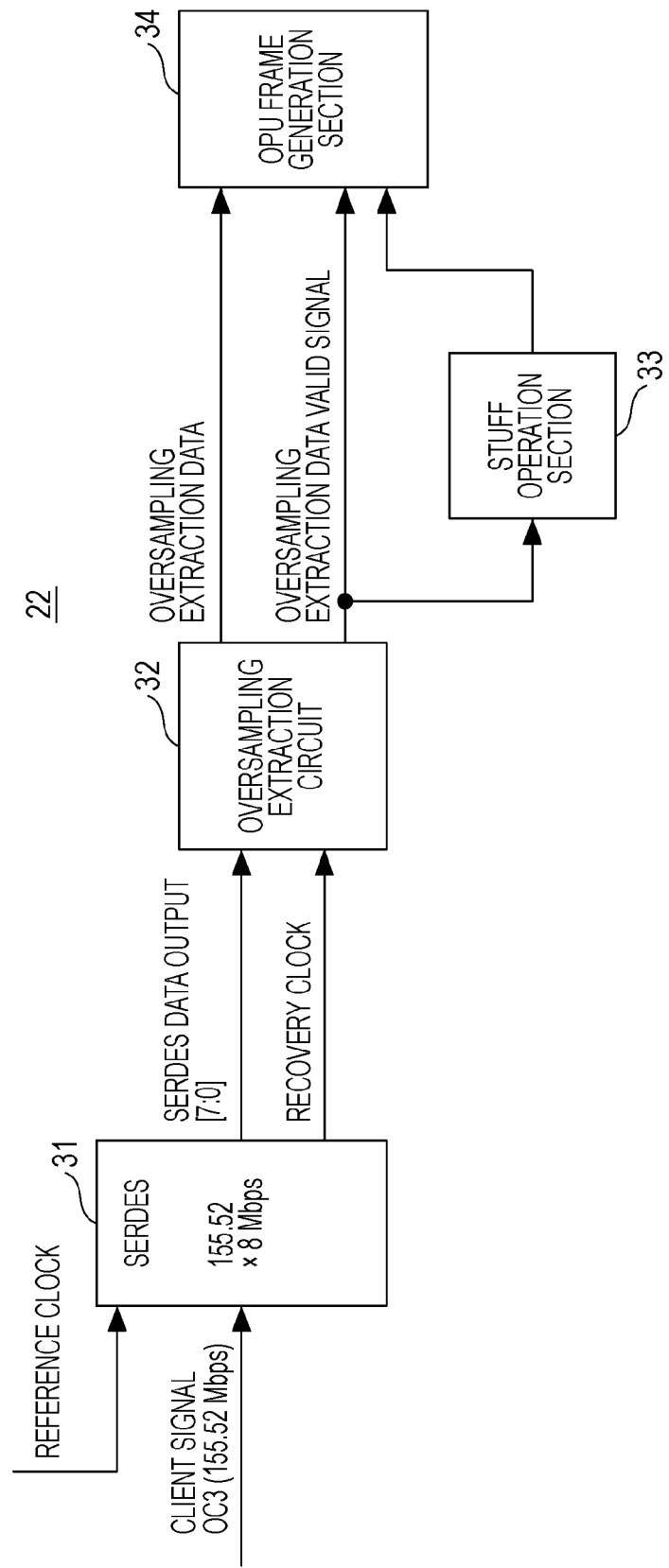
FIG. 2B is a circuit configuration diagram of OPU frame mapping in a general low-speed interface processing section.

Constituent parts the same as those of FIGS. 2A and 2B are assigned the same reference numerals and are not described again.

In the optical transmission device 102 of FIG. 6A, optical modules $21_1$ to $21_k$ receive multiple client signals (optical signals). The received data are subjected to reception processing and mapped into OPU frames by low-speed interface processing sections $122_1$ to $122_k$ (hereinafter referred to as "low-speed interface processing sections 122" collectively), and then selected by a cross-connect section 23.

The selected data are multiplexed by a multiplexer 24, and then accommodated in OTN frames by a high-speed interface processing section 26. The OTN frames are converted into optical signals by an optical module 27, and the optical signals are transmitted to an OTN network.

OTN frames received from the OTN network are subjected to the above processes in the reverse order.

Specifically, a signal taken out of an OTN frame by the high-speed interface processing section 26 is divided into multiple outputs by a demultiplexer 25 and selected by the cross-connect section 23.

The low-speed interface processing sections 122 extracts client signals from OPU frames received from the cross-connect section 23. The client signals thus extracted are converted into optical signals by and output from the optical modules $21_1$ to $21_k$.

FIG. 6B illustrates a circuit configuration of each low-speed interface processing section 122.

The low-speed interface processing section 122 includes a SERDES 31, an oversampling extraction circuit, an OPU frame generation section 34, a stuff operation section 33, and a consecutive-bit judgment section 131 interposed between the SERDES 31 and the stuff operation section 33. A large-scale integration (LSI) chip may include OPU frame generation section 34, a stuff operation section 33, and a consecutive-bit judgment section 131. An LSI chip may include LSI chips. An LSI may include Field Programmable Gate Array (FPGA).

The consecutive-bit judgment section 131 and the stuff operation section 33 constitute a stuff control section 135.

The SERDES 31 is configured to use a reference clock to reproduce a recovery clock from a serially transmitted client signal, and also configured to oversample the client signal at a rate of 8 times the original rate for example and output parallel data (indicated by "SERDES data output" in the drawing).

The SERDES output data is fed to the oversampling extraction circuit 32 and the consecutive-bit judgment section 131.

The oversampling extraction circuit 32 is configured to detect a change point in the parallel data output from the SERDES 31, extract data from a midpoint between one data change point and the subsequent data change point as valid data, and output the extracted data together with an oversampling extraction data valid signal.

If no data change point is detected, the circuit selects and extracts valid data based on the position of a previous change point.

The consecutive-bit judgment section 131 is configured to detect a data change point from the SERDES data output, calculate a value to be added to a Cn value at a grain size of the reciprocal of the oversampling rate, and feed the value to be added thus obtained to the stuff operation section 33.

In the case of performing the k-times (k is the power of 2) oversampling on the client signal, the consecutive-bit judgment section calculates the amount of data to be added to the Cn value in units of 1/k bits, and outputs any of k, k+1, and k−1 as the value to be added to the Cn(n=1/k) value.

Specifically, in the case of the 8-times oversampling, the consecutive-bit judgment section calculates the value to be added in units of ⅛ bits and outputs any of +7, +8, and +9 to the stuff operation section 33 for the stuff operation of $C_{1/8}$.

As illustrated in FIG. 7, if the frequency of the reference clock and the frequency of the client signal are equal to each other, a SERDES data output of 8 bit width is obtained at all times as a result of the sampling of the client signal.

Data from a midpoint between data change points (the fourth data from the change point in this example) is thus extracted stably as valid data.

In the conventional configuration, +1 is added to the Cn(n=1) value of the stuff operation every time valid data is extracted.

On the other hand, according to the embodiment, the consecutive-bit judgment section 131 counts the number of data for the stuff operation in units of ⅛ bits.

In the case of FIG. 7, 1 bit of the client signal corresponds to 8 parallel data each having a weight of ⅛, and +8 is output at all times as the value to be added to the Cn(n=⅛) value.

Figure 8:
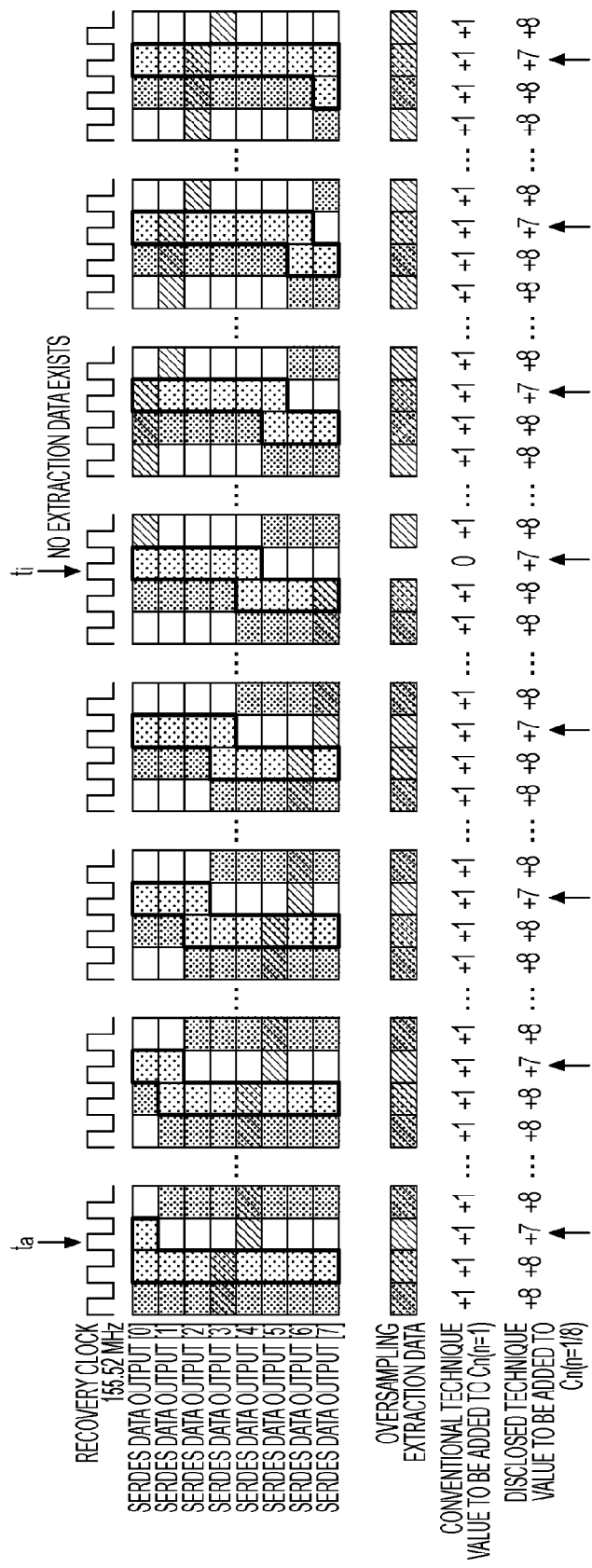
FIG. 8 is a diagram explaining a stuff operation according to the embodiment.

As illustrated in FIG. 8, if the frequency of the reference clock is faster than the frequency of the client signal and a SERDES data output of 9 bit width is obtained as a result of the sampling of the client signal, the consecutive-bit judgment section 131 outputs +7 as the value to be added to the Cn(n=⅛) value to the stuff operation section 33.

Specifically, although parallel data of 9-bit width corresponds to 1 bit of the client signal, the parallel data of the last bit is deemed 0 because 8 sets of ⅛-bit parallel data constitute 1 bit of the client signal.

In this case, the number of data at a time point $t_a$ is $0+(⅛)×7=(⅛)×7$, and thus the value to be added to the $Cn(n=⅛)$ value is +7.

Even when no valid data to be extracted exists at a time point $t_i$, the consecutive-bit judgment section 131 outputs, to the stuff operation section 33, not zero but the amount of data (+7) having a weight of ⅞ $((⅛)×4+(⅛)×3=(⅛)×7)$.

Figure 9:
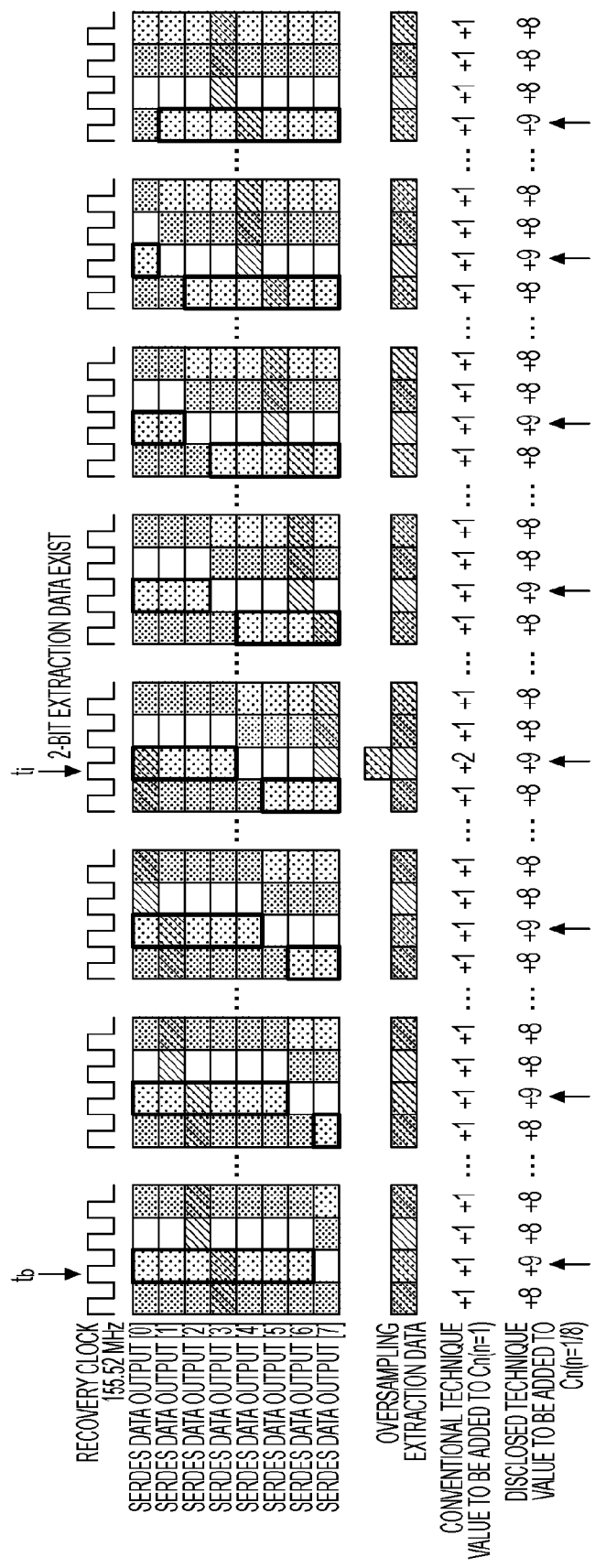
FIG. 9 is a diagram explaining the stuff operation according to the embodiment.

As illustrated in FIG. 9, if the frequency of the reference clock is slower than the frequency of the client signal and a SERDES data output of 7 bit width is obtained as a result of the sampling of the client signal, the consecutive-bit judgment section 131 outputs +9 as the value to be added to the $Cn(n=⅛)$ value to the stuff operation section 33.

When 1 bit of the client signal is converted into parallel data of 7 bit width, 7 bits of the parallel data constitute 1 bit of the client signal, and thus a weight held by the last bit is set at ⅖.

The value to be added to the $Cn(n=⅛)$ value at a time point $t_b$ is +9 from $(⅛)×8+(⅛)=(⅛)×9$.

Even when 2-bit valid data are extracted at a time point $t_j$, the value to be added to the $Cn(n=⅛)$ value does not become twice, but instead the amount of data having a weight of 9/8 is output $((⅛)×5+(⅛)×4=(⅛)×9)$.

When there is no data change point, the consecutive-bit judgment section 131 outputs +8 as the value to be added to the $Cn(n=⅛)$ value to the stuff operation section 33 based on the assumption that a SERDES data output of 8 bit width is obtained as a result of the sampling of 1 bit of the client signal.

The stuff operation section 33 is configured to calculate the $Cn(n=⅛)$ value for each type of the client signal from the additional value information received from the consecutive-bit judgment section 131.

The stuff operation section 33 is also configured to calculate the number of data of the client signal to be actually mapped into one OPU frame (Cm value) and the number of data of the client signal to be accumulated without being mapped (ΣCnD value) (n=1, m=8) according to the following equations.

$$C_m(t) = \text{int}\left(\frac{n \times C_n}{m}\right) = \text{int}\left(\frac{\frac{1}{8} \times C_{\frac{1}{8}}}{8}\right) = \text{int}\left(\frac{1}{64} C_{\frac{1}{8}}\right)$$

$$\sum C_{1D}(t) = \text{int}\left(\frac{1}{8} \sum C_{\frac{1}{8}D}(t)\right)$$

Here, $Cn(n=⅛)$, that is, $C_{1/8}$ is used as the basis of the computation.

The OPU frame generation section 34 is configured to generate an OPU frame based on the oversampling extraction data (extracted valid data) and the oversampling extraction data valid signal which are output from the oversampling extraction circuit 32, and the $Cn(n=⅛)$ value, Cm value, and ΣCnD value (n=1, m=8) provided by the stuff operation section 33.

In the generation of an OPU frame, the client signal is mapped into the payload area of the OPU frame, and the Cm value and CnD value are inserted into the overhead area of the OPU frame as JC bytes.

When the client signal is mapped into the payload area, destuffing or stuffing for each payload byte (j=1, 2, . . . , 15232) according to the following destuffing/stuffing conditions.

If (j×Cm) mod 15232<Cm: destuffing
If (j×Cm) mod 15232≥Cm: stuffing

The reception side extracts the Cm value from the JC bytes in the received OPU frame, and identifies the client signal in the payload area of the OPU frame based on the above destuffing/stuffing conditions.

The reception side also generates a client signal valid signal representing the frequency of the client signal.

Then, the reception side generates a clock from the client signal valid signal and uses the clock as a reference clock of the SERDES, and serializes and outputs the client signal extracted from the OPU frame.

FIG. 10 is a diagram illustrating an effect brought by the configuration and method of the embodiment.

In the case of mapping a low-speed client signal into an OPU frame, both the cycle and amplitude of the gap caused by the difference between the frequencies of the client signal and the reference clock are reduced in comparison with those of the conventional method.

According to the embodiment, the value of the unit bit n used in the Cn operation is set at the reciprocal of the sampling rate k, so that the stuff operation is performed at a grain size of 1/k (k-times finer granularity).

For example, when the unit bit n for performing the Cn operation by way of the 8-times oversampling is set at n=⅛, both the cycle and amplitude of the generated gap (phase deviation between the client signal and the reference clock) are reduced to one-eighth those of the conventional method, as illustrated in FIG. 10.

This makes it possible to suppress both jitter which is a short-term variation of a signal waveform and wander which is a long-term variation thereof.

Such an effect may also be explained with FIGS. 8 and 9.

In comparison with the cycle in which the value to be added to the $Cn(n=1)$ value shifts from +1 to +0 or +2 with the conventional method, the cycle in which the value to be added to the $Cn(n=⅛)$ value shifts from +8 to +7 (FIG. 8) or from +8 to +9 (FIG. 9) is reduced to one-eighth.

In addition, the percentage of variation from +8 to +7 or +9 is one-eighth the percentage of variation from +1 to +0 or +2.

The accumulation of the phase deviation (gap) between the frequencies of the client signal and the reference clock is distributed over the entire processing, thereby reducing the variation.

In the case of performing the 16-times oversampling, the stuff operation ($Cn(n=1/16)$) is performed at 16 times finer granularity.

If 17 sets of parallel data are output upon input of 1 bit of the client signal due to the difference between the frequencies of the client signal and the reference clock, +15 is output as the value to be added to the $Cn(n=1/16)$.

If 15 sets of parallel data are output upon input of 1 bit of the client signal, +17 is output as the value to be added to the $Cn(n=1/16)$.

The variation amount and variation cycle due to the difference between the frequencies of the client signal and the reference clock are reduced to one-sixteenth the conventional ones, thereby suppressing jitter and wander.

As has been described so far, by performing the stuff operation (Cn operation) at k-times finer granularity than that of the conventional method, the phase deviation or difference between the frequencies of the client signal and the reference clock may be reduced to 1/k, thereby suppressing jitter and wander.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmission device, comprising:
    a serializer and deserializer configured to convert an input client signal into parallel data at a sampling rate of k times (k is a power of 2) a rate of the input client signal and output the parallel data;
    a frame generation circuit configured to generate an optical channel payload unit (OPU) frame from the client signal; and
    a stuff control circuit including a stuff operation circuit and a consecutive-bit judgment circuit, the consecutive-bit judgment circuit being connected to an output of the parallel data, the stuff operation circuit being configured to perform, in units of 1/k bits, a stuff operation to map the client signal into the OPU frame and thereby calculate a Cn(n=1/k) value which is a theoretical value of the stuff operation, the consecutive-bit judgment circuit being configured to detect a data change point from the parallel data, calculate an additional value to be added to the Cn(n=1/k) value based on the change point, and feed the additional value to the stuff operation circuit to be added to the Cn(n=1/k) value.

2. The optical transmission device according to claim 1, wherein
    the consecutive-bit judgment circuit is configured to count the number of data of the client signal per unit time in the units of 1/k bits based on the change point and output any of k, k+1, and k−1 as the additional value to be added to the Cn(n=1/k) value, and
    the stuff operation circuit is configured to calculate the Cn(n=1/k) value from the additional value and calculate a Cm value from the Cn(n=1/k) value, the Cm value representing an amount of data of the client signal to be mapped into the OPU frame.

3. The optical transmission device according to claim 2, wherein the consecutive-bit judgment circuit outputs (k−1) as the additional value when 1 bit of the client signal turns into an output of the parallel data of (k+1) bit width, and outputs (k+1) as the additional value when 1 bit of the client signal turns into an output of the parallel data of (k−1) bit width.

4. The optical transmission device according to claim 2, further comprising an extraction circuit configured to extract valid data from the parallel data, wherein
    the frame generation circuit generates the OPU frame based on the valid data and the Cm value.

5. An OPU frame generation method comprising, in an optical transmission device:
    converting an input client signal into parallel data at a sampling rate of k times (k is a power of 2) a rate of the input client signal;
    performing, in units of 1/k bits, a stuff operation to map the client signal into an OPU frame and thereby calculating a Cn(n=1/k) value which is a theoretical value of the stuff operation;
    detecting a data change point from the parallel data, calculating an additional value to be added to the Cn(n=1/k) value based on the change point, and adding the additional value to the Cn(n=1/k) value;
    generating the OPU frame to transmit the client signal, based on the Cn(n=1/k) value.

6. The OPU frame generation method according to claim 5, further comprising:
    counting the number of data of the client signal per unit time in the units of 1/k bits based on the change point, and outputting any of k, k+1, and k−1 as the additional value to be added to the Cn(n=1/k) value;
    calculating the Cn(n=1/k) value from the additional value; and
    calculating a Cm value from the Cn(n=1/k) value, the Cm value representing an amount of data of the client signal to be mapped into the OPU frame.

* * * * *